Jan. 17, 1961     L. W. PARMATER ET AL     2,968,765
DISTRIBUTOR CONTACT POINT GAP TESTER
Filed May 29, 1958     2 Sheets-Sheet 1
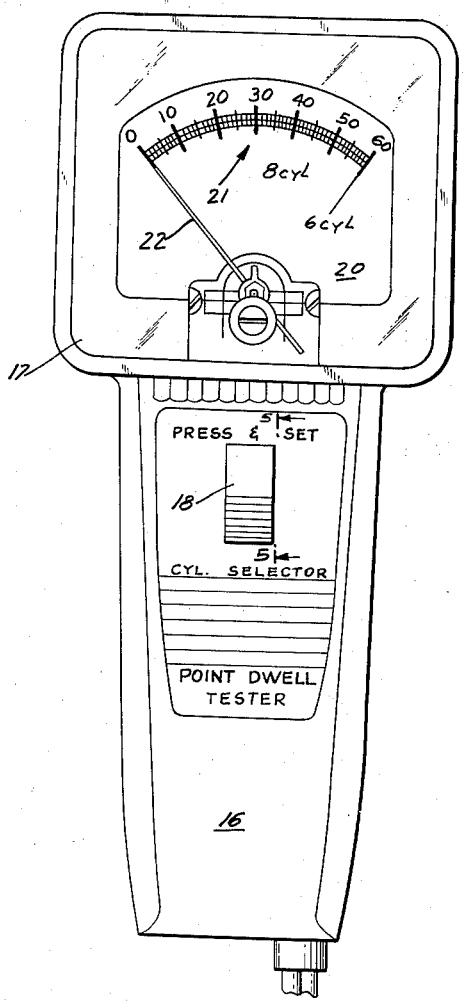
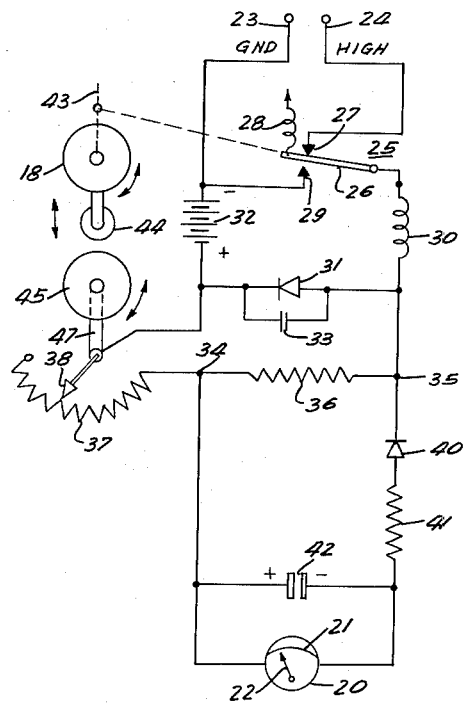
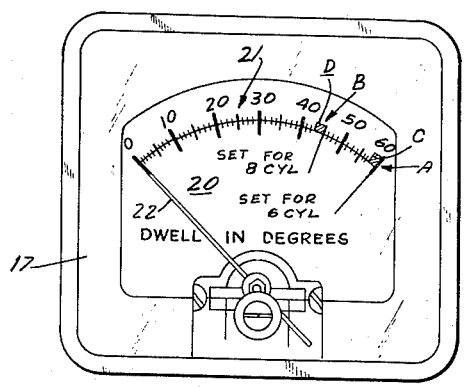
INVENTORS
LEE W. PARMATER
ROBERT M. CAIN
BY
ATTORNEYS

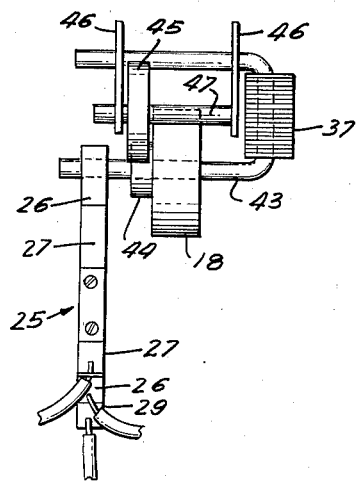
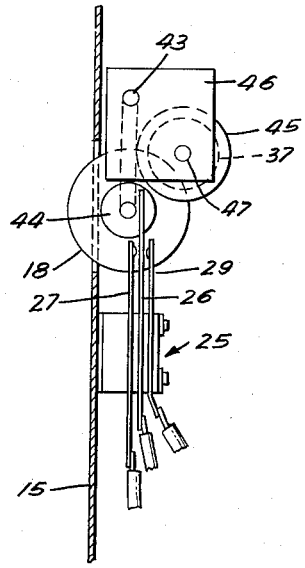
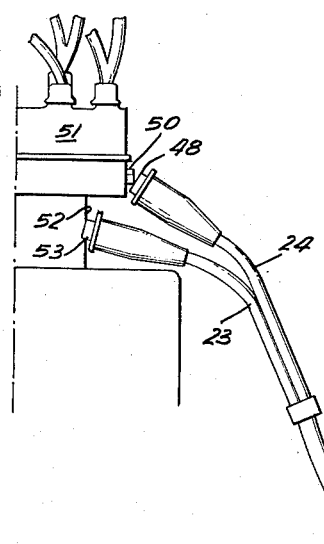
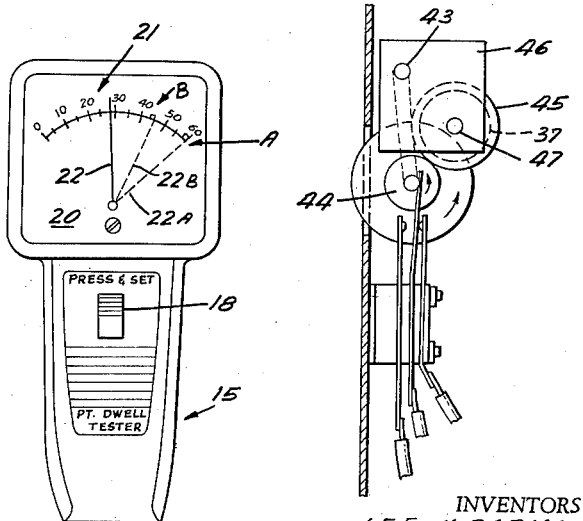

United States Patent Office 2,968,765
Patented Jan. 17, 1961

2,968,765

DISTRIBUTOR CONTACT POINT GAP TESTER

Lee W. Parmater, 10131 Riverview Drive, Kalamazoo, Mich., and Robert M. Cain, 3932 Canterbury Drive, Kalamazoo, Mich.

Filed May 29, 1958, Ser. No. 738,675

1 Claim. (Cl. 324—156)

This invention relates to novel instruments for measuring the contact point gap of distributors of automotive engines.

The primary object of the invention test instrument is to electrically measure distributor contact point gap with the engine running. This is accomplished by measuring in degrees the length of time the contact points are closed. Dwell in degrees is the number of degrees the distributor cam rotates with the contact points closed.

Dwell testers of the type herein, as heretofore built, comprised either a meter with a multitude of scales to allow for the various number of cylinders, or else a switch to be set to the number of cylinders to be tested. Since the unit usually must be calibrated immediately prior to use, this selector switch normally had another position called "set." In addition to this "set" position the calibrating operation involved another control, a potentiometer. The calibrating procedure, therefore, on units built heretofore involved turning the function switch to set position, adjusting the set control, and then returning the function switch to the proper cylinder position. Even on units where a multitude of scales were used, thereby eliminating the prime function of a cylinder switch, there had still been the necessity of having a similar switch which would be turned to "set" position and then to "use" position.

Such prior art dwell testers required a degree of thinking, coordination and skill on the parts of the operator. The "set" operation therefore was requisite as a pre-adjustment or calibration to avoid erroneous readings. Should the operator thereupon forget to turn off the selector switch from "set," the internal batteries are caused to discharge and the unit rendered inoperative.

Another disadvantage of such prior types of units was that after the calibration procedure had been accomplished and the function switch returned to one of the "use" positions, any accidental bumping of the potentiometer knob naturally throws the unit off calibration. Unfortunately, the operator may not realize this had happened, and therefore make all his tests erroneously.

The present invention provides a novel dwell tester with an uncomplicated-looking meter with only one scale on it. Instead of a switch for selecting the number of cylinders, a different calibrating index for the various number of cylinders is employed. The net result of this approach is that simultaneously the operator is allowed to see only one unconfusing meter scale and at the same time, is not bothered with a function switch.

The invention tester is hand-portable with a single control element mounted for ready operation by the thumb. The tester is calibrated with a simple single control which operates as follows: The operator presses down on a thumb wheel and as he does so, a leaf switch is actuated automatically. This serves to arrange the circuits for calibrating or, as described, above, "setting." As the operator presses this knob he also engages a clutch between the thumb wheel and a potentiometer so that rotating action of the thumb wheel while under pressure permits the operator to calibrate the test instrument. The calibration, consists in rotating the thumb wheel until the meter hand coincides with the proper set position for that particular number of cylinders being tested, as will be set forth in detail.

After the operator has completed this simple one-handed operation, he releases pressure on the thumb wheel at which time the potentiometer clutch is disengaged so that further rotation of the thumb wheel, whether accidental or not, will not throw the unit off calibration. Since the leaf switch has sufficient restoring force, the normal condition of this switch without thumb pressure is open and therefore the operator cannot possibly leave the unit in such a way as to discharge the batteries.

The hand-portable dwell tester of the present invention is extremely simple for the operator to use. He merely connects two leads, one to ground and one to the primary terminal of the distributor; starts the engine. He presses the thumb wheel and goes through a simple calibrating procedure, to be described. Upon releasing his thumb, he reads the dwell angle immediately, and without further thinking on his part.

The circuitry of the invention tester is simple, effective, and contains a small battery for direct calibrating purposes. The meter sensitivity, scale and circuit parameters are proportioned to give readings in actual degrees of dwell, i.e. the number of degrees the distributor cam rotates with the contact points closed. The circuit is arranged to have a very low load drain on the engine power, permitting the motor to operate normally during the tests. Accurate readings are thus assured.

It is accordingly an object of the present invention to provide a novel point dwell tester operable with a single control and a single scale.

Another object of the present invention is to provide a novel point dwell tester that is hand-portable and readily calibrated through a thumb control thereon.

A further object of the present invention is to provide a novel point dwell tester, the calibration of which is undisturbed by external unintentional switch abutment.

The above and further objects of the present invention will become more apparent from the following description of an exemplary embodiment thereof, illustrated in the accompanying drawings, in which:

Figure 1 is a face view of an exemplary form of my invention tester.

Figure 2 is a schematic diagram of the circuitry and control system for the tester.

Figure 3 is a face view of the scale system of the tester.

Figure 4 is a front view of the tester control system.

Figure 5 is an elevational view of the tester control system in the non-calibration mode, taken along the line 5—5 of Figure 1.

Figure 6 is a view corresponding to that of Figure 5, in the calibration mode.

Figure 7 is a diagrammatic view of the tester as connected for distributor testing.

Figure 1 shows the exemplary tester 15 having a handle portion 16 that is gripped by one hand. The circuit elements are contained within the housing of handle 16 and head 17. A control element 18 at the "press and set" location, is readily operated by the thumb. Element 18 is cylindrical, rotatably mounted, and spring pressed outwardly as is more fully set forth in connection with Figures 4, 5 and 6. It is used for pre-calibration of the tester 15 in the dwell tests, as will be described in detail hereinafter. The meter 20, set in head portion 17, has a uniform scale 21 calibrated in sixty units, designating dwell degrees through meter pointer 22.

The preferred circuit arrangement for the tester hereof is schematically shown in Figure 2. The external leads 23, 24 connect to the distributor system, lead 23 to ground, "high" lead 24 to the primary terminal of the distributor (see Figure 7). A single pole double through switch 25 has its blade 26 biased normally against contact 27 through schematically indicated spring 28. It is pressed against opposite contact 29 during the calibration mode. Blade 26 is connected to radio frequency choke 30, whereby the distributor connection via lead 24 is impressed through choke 30 to rectifier 31. A battery 32, e.g. at three volts has its positive terminal connected to rectifier 31 and its negative terminal to the return "ground" lead 23. A by-pass condenser 33, such as .01 mfd. shunts rectifier 31. A crystal diode, such as type 1N34 is satisfactory at 31.

The potential thus built-up across rectifier 31 is applied to the meter 20 circuit section 34, 35 through an adjustable tapped, resistance arrangement including fixed resistor 36 and rheostat 37 in series therewith and across rectifier 31. Thus, adjustment of arm 38 of rheostat 37 controls the ratio of the potential from rectifier 31 applied to meter tap-off 34, 35. The meter circuit comprises rectifier 40 in series with resistor 41 and the direct current meter 20. Resistor 36 in this embodiment was 120 ohms; resistor 41, 180 ohms; and rectifier 40 a 1N34 crystal diode. A high capacity low-voltage electrolytic condenser 42 shunts meter 20 to smooth its indications.

Prior to measurement of the dwell angle the instrument circuit is calibrated. The thumb wheel 18 is pressed down whereupon the leaf spring blade 26 of switch 25 disconnects from "high" lead 24 by-passing the distributor circuit, and connecting to contact 29 to establish the local calibrating circuit. Switch contact 29 is connected to the negative terminal of internal battery 32. This connects the full voltage, e.g. 3 volts of battery 32 across the rectifier 31 as well as across resistor 36, 37 at points 35 and 38. The portion of this voltage applied to meter 20 is determined by the position of tap 38 in rheostat 37, as the potential tap 34, 35.

In order to provide the simplification of a single scale 21, I arrange for pre-setting and calibration of the meter 20 with respect to the common scale 21, for either a 6 or 8 cylinder engine being tested. Other cylinder totals may likewise be incorporated. In the exemplary tester the reading A ("60") coincides with the rheostat 37 setting for "6 cylinders"; the reading B ("45"), for "8" cylinders (see Figure 3). The "degrees" readings of scale 21 will correspond to actual dwell degrees of the distributor contact point gap. For four cylinder engines, the calibration is set at B for "8" cylinders, and the dwell reading is multiplied by two.

An important feature of my invention is the calibration and setting of the tester solely through the single thumb wheel 18. Figure 2 schematically illustrates this important and advantageous arrangement, and Figures 4, 5 and 6 show a structural embodiment thereof. Thumb wheel 18 has a smaller disc 44 coaxial with it, and rotatable therewith. Wheel 18 and disc 44 rotate freely on one leg of a U-rod 43 (Figure 4). Disc 44 is engageable with wheel or disc 45 rotatably secured with tap arm 38 of rheostat 37. The central blade 26 of switch 25 is arranged to normally press rod 43 and disc 44 out of contact with disc 45 (see Figures 2 and 5). Thus rotation of thumb wheel 18 does not affect any setting of rheostat 37. Also the battery 32 is not in connection across the tester circuitry.

When thumb wheel 18 is pressed into handle of tester 15, it overcomes the bias of spring blade 26, opens the lead 24 circuit to distributor, and closes on contact 29 to connect battery 32 into the tester circuit for the calibration mode. Discs 44 and 45 peripherally engage, and rotation through the thumb of wheel 18 causes variable tap 38 of rheostat 37 to be motivated into the proper position. As hereinabove stated, rheostat 37 is "set" when the pointer is at the predetermined markings A or B in accordance with the number of cylinders in the engine to be tested. Release of the operator's thumb from wheel 18 leaves rheostat 37 at its "set" position, disconnects battery 32 from the local circuit and establishes the test mode for the tester 15.

As seen in Figures 4, 5 and 6, the U-rod 43 is pivotally mounted in spaced brackets 46, 46. Disc 45 is rotatably mounted in brackets 46, 46 through shaft 47, which also engages with rheostat arm 38 within fixedly supported rheostat arm 37. The discs 44 and 45 frictionally engage along their cylindrical peripheries for resetting rheostat arm 38 when thumb wheel 18 is pressed and rotated. The switch blade 26 repositions thumb wheel 18 and disengages discs 44, 45 when the thumb pressure is released from wheel 18.

Figure 7 illustrates the connection of tester 15 to the distributor for the dwell testing. The "high" lead 24 has a booted alligator clip 48 at its end, connected to the primary terminal 50 of the distributor 51. The "ground" lead 23 has a booted alligator clip 53 connected to a suitable ground 52 of the engine. The thumb wheel 18 is then pressed firmly and rotated to move the meter pointer 22 to position 22A (for six cylinders) or 22B (for eight cylinders). The thumb wheel 18 is released. With the engine running the dwell is read directly on scale 21, in degrees.

The engine is then slowly accelerated to about 2000 r.p.m. and then returned to idle speed. The dwell reading should not vary more than three degrees within this speed range, for proper adjustment or distributor functioning. Distributor point opening has a direct bearing on dwell. Closing the point gap permits them to stay closed longer, thus giving a higher reading on the dwell meter, opening the point gap will give a lower reading.

The degree reading on the dwell tester will be inaccurate if the point resistance is excessive. The engine will not operate properly due to poor or weak ignition when excessive primary resistance is present. The invention tester 15 can be used to make the resistance test. It is connected as shown in Figure 7. The distributor contact points must be closed when making the resistance test. This can be determined with the thumb selector 18 released, igniiton key "On" and engine not running. Any reading on the meter indicates that the points are closed. If meter pointer stays on zero, remove the high tension wire from ignition coil and rotate engine until contact points close as indicated by a reading on meter. To set . . . press thumb selector 18 firmly and rotate to move pointer so that it stands on "Set for 8 cylinder" (B) or "Set for 6 cylinder" (A) depending upon the number of engine cylinders.

The thumb wheel or selector 18 is then released, and the ignition key is at "On." The meter 20 pointer 22 should remain in a narrow region adjacent A or B indicated respectively at C and D in Figure 3 for good resistance conditions. If the pointer 22 moves outside of the respective C or D area there is excesive resistance indicated. Pin pointing of the poor resistance region may be performed with the tester 15, in a similar manner to that described herein.

While we have set forth our invention in connection with an exemplary embodiment thereof, it is to be understood that modifications and variations in its construction, arrangement and application may be made by those skilled in the art without departing from the broader spirit and scope thereof, as set forth in the following claim.

We claim:

A test instrument comprising a hand-portable casing with a hand grip portion containing an exposed thumb wheel, circuit elements including a meter within said casing, a switch having a spring blade arranged to bias said thumb wheel outwardly of the casing, a first contact of said switch normally establishing the instrument circuit for the testing in conjunction with said blade, a second contact of said switch established with said blade upon movement of said thumb wheel thereagainst connecting an internal battery to the meter circuit for calibration setting of the meter, a pivoted rod rotatably carrying said thumb wheel, said switch blade pressing against said rod to bias said thumb wheel outwardly of the casing, a first disc coupled to said thumb wheel, a second disc disposed adjacent said first disc and engaging said first disc upon inward displacement of said thumb wheel against the bias of said switch blade, and a rheostat in the meter circuit adjustably coupled to said second disc for calibrating the meter and the circuit upon rotation of said thumb wheel while in its inward displaced position.

References Cited in the file of this patent

UNITED STATES PATENTS

| | | |
|---|---|---|
| 1,120,217 | Morris | Dec. 8, 1914 |
| 2,118,933 | Macadie | May 31, 1938 |
| 2,351,441 | Makuh | June 13, 1944 |
| 2,444,014 | Williams | June 22, 1948 |
| 2,463,567 | Samstag | Mar. 8, 1949 |
| 2,558,282 | Triplett | June 26, 1951 |
| 2,663,845 | Koch | Dec. 22, 1953 |
| 2,839,723 | Armond | June 17, 1958 |